(12) United States Patent
Saiki

(10) Patent No.: US 8,292,999 B2
(45) Date of Patent: Oct. 23, 2012

(54) EXHAUST PIPE PAINT, METHOD FOR PRODUCING EXHAUST PIPE, AND EXHAUST PIPE

(75) Inventor: Kenzo Saiki, Ogaki (JP)

(73) Assignee: Ibiden Co., Ltd., Ogaki-shi (JP)

( * ) Notice: Subject to any disclaimer, the term of this patent is extended or adjusted under 35 U.S.C. 154(b) by 245 days.

(21) Appl. No.: 12/647,404

(22) Filed: Dec. 25, 2009

(65) Prior Publication Data

US 2010/0180799 A1     Jul. 22, 2010

(30) Foreign Application Priority Data

Jan. 22, 2009   (JP) ................... 2009-012329

(51) Int. Cl.
| | |
|---|---|
| C04B 41/50 | (2006.01) |
| C09K 17/40 | (2006.01) |
| C09D 1/02 | (2006.01) |
| C09D 1/00 | (2006.01) |
| C09D 4/00 | (2006.01) |
| C09J 1/02 | (2006.01) |

(52) U.S. Cl. ............... 106/287.1; 106/287.17; 106/600; 106/31.95

(58) Field of Classification Search .............. 501/15, 501/17, 18, 20, 21, 26; 106/287.1, 287.17, 106/600, 38.3, 38.9, 31.95, 676, 489

See application file for complete search history.

(56) References Cited

U.S. PATENT DOCUMENTS

| | | | | |
|---|---|---|---|---|
| 4,332,618 A | * | 6/1982 | Ballard | 106/605 |
| 4,523,662 A | | 6/1985 | Tanaka et al. | |
| 4,676,064 A | | 6/1987 | Narita et al. | |
| 4,680,239 A | * | 7/1987 | Yano et al. | 428/688 |
| 5,143,275 A | * | 9/1992 | Hara et al. | 228/119 |
| 5,698,026 A | * | 12/1997 | Boaz | 106/600 |
| 5,909,881 A | | 6/1999 | Segawa | |
| 6,436,543 B1 | * | 8/2002 | Endo et al. | 428/447 |
| 2002/0009622 A1 | | 1/2002 | Goodson | |
| 2008/0127855 A1 | | 6/2008 | Wilson | |

FOREIGN PATENT DOCUMENTS

| | | |
|---|---|---|
| JP | 7-301113 | 11/1995 |
| JP | 2005-194962 | 7/2005 |
| WO | WO 2005/005680 | 1/2005 |

OTHER PUBLICATIONS

European Search Report issued by the European Patent Office on Mar. 29, 2010.

* cited by examiner

*Primary Examiner* — Noah Wiese

(74) *Attorney, Agent, or Firm* — Ditthavong Mori & Steiner, P.C.

(57) ABSTRACT

An exhaust pipe paint for application to an exhaust pipe base includes an inorganic glass particle, an inorganic particle, and at least one of an inorganic binder and a precursor of the inorganic binder. The inorganic binder partially softens at a softening temperature of the inorganic glass particle.

14 Claims, 4 Drawing Sheets

A-A line cross-sectional view

B-B line cross-sectional view

EXHAUST PIPE PAINT, METHOD FOR PRODUCING EXHAUST PIPE, AND EXHAUST PIPE

CROSS-REFERENCE TO RELATED APPLICATIONS

This application claims priority of Japanese Patent Application No. JP 2009-012329 filed on Jan. 22, 2009, the contents of which are incorporated herein by reference in their entirety.

BACKGROUND OF THE INVENTION

1. Field of the Invention

The present invention relates to an exhaust pipe paint, a method for producing an exhaust pipe, and an exhaust pipe.

2. Discussion of the Background

A catalytic converter is provided in the path of an exhaust pipe to treat toxic substances, such as harmful gas contained in exhaust gas discharged from an engine.

For example, an exhaust pipe that has a double-pipe structure and in which a movable heat transfer member is provided between the inner pipe and the outer pipe of the double pipe is disclosed (JP-A 2005-194962).

The contents of JP-A 2005-194962 is incorporated herein by reference in their entirety.

SUMMARY OF THE INVENTION

According to one aspect of the present invention, an exhaust pipe paint for application to an exhaust pipe base includes an inorganic glass particle, an inorganic particle, and at least one of an inorganic binder and a precursor of the inorganic binder, the inorganic binder partially softening at a softening temperature of the inorganic glass particle.

According to another aspect of the present invention, a method for producing an exhaust pipe includes applying an exhaust pipe paint to an exhaust pipe base to manufacture a painted pipe, the exhaust pipe paint including an inorganic glass particle, an inorganic particle, and at least one of an inorganic binder and a precursor of the inorganic binder, the inorganic binder partially softening at a softening temperature of the inorganic glass particle. The method also includes attaching the painted pipe to an exhaust port of an engine. The method further includes discharging exhaust gas from the exhaust port of the engine and thereby passing the exhaust gas at a temperature equal to or higher than the softening temperature of the inorganic glass particle through the painted pipe to produce a surface coat layer on the exhaust pipe base.

According to further aspect of the present invention, an exhaust pipe includes an exhaust pipe base, and a surface coat layer formed on the exhaust pipe base. The surface coat layer includes an inorganic glass, an inorganic particle, and an inorganic binder. In the inorganic glass, a part of the inorganic binder is diffused and the inorganic particle and the rest of the inorganic binder in particulate form are dispersed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
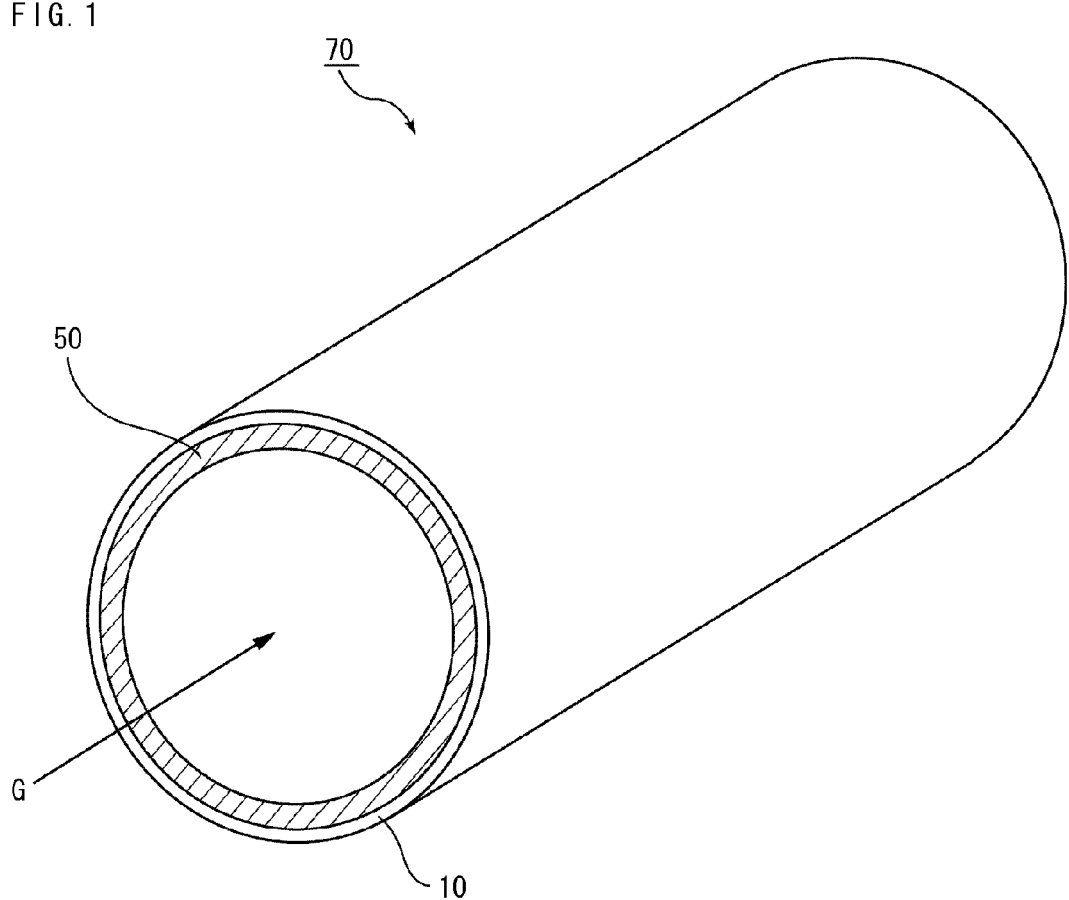
FIG. 1 is a perspective view schematically illustrating an exhaust pipe base (painted pipe) to which an exhaust pipe paint according to an embodiment of the present invention is applied.

The embodiments will now be described with reference to the accompanying drawings, wherein like reference numerals designate corresponding or identical elements throughout the various drawings.

An exhaust pipe has a surface coat layer. An exhaust pipe paint containing inorganic particles having a high emissivity, inorganic glass particles, and an inorganic binder having a softening temperature higher than that of the inorganic glass particles is applied to the surface of an exhaust pipe base. To the resulting exhaust pipe base, heat of exhaust gas is applied and a surface coat layer is formed.

Heat dissipation required of the exhaust pipe is more easily secured by inorganic particles contained in the surface coat layer in the exhaust pipe, and parts, such as an inner pipe, for improving heat dissipation, are not needed. Therefore, the exhaust pipe is advantageous in terms of its simple structure.

Since the exhaust pipe paint contains an inorganic binder which has a softening temperature higher than that of the inorganic glass particles, a heating treatment is not required in manufacturing the exhaust pipe. Advantageously, the exhaust pipe can be manufactured after application of this paint to the exhaust pipe base, by taking advantage of heat of exhaust gas.

This point is specifically described with reference to the case where the inorganic glass particles have a softening temperature of about 700° C., the inorganic binder has a softening temperature which is higher than that of the inorganic glass particles and is exceeding about 1000° C., the temperature of exhaust gas is about 600° C. in engine startup operation, and the temperature of exhaust gas is about 1000° C. in a steady-state operation.

The temperature of exhaust gas is set in the above range because the temperature of exhaust gas reaches about 1000° C. at a steady-state operation in some cases. This is because of the recent tendency of engines running under the high-loads and high-rotations condition for the purpose of improving engine output and fuel efficiency.

In order to manufacture such an exhaust pipe, an exhaust pipe paint obtained by adding a dispersing solvent and the like to inorganic glass particles, inorganic particles and an inorganic binder is first applied to the surface of an exhaust pipe base, and a drying treatment is performed on the exhaust pipe base to manufacture a painted pipe. The dispersing solvent contained in the exhaust pipe paint volatilizes during the drying treatment, and the inorganic glass particles and the like are presumably fixed to the surface of the exhaust pipe base temporarily.

It is to be noted that the exhaust pipe paint contains an inorganic binder and that the inorganic binder binds inorganic glass particles and the inorganic particles. Accordingly, the inorganic glass particles temporarily fixed to the surface of the exhaust pipe base (hereinafter, also referred to as a dispersoid layer) are presumably less likely to peel from the exhaust pipe base even with shocks such as vibration.

When the painted pipe is attached to an exhaust port of an engine without undergoing a heating treatment, exhaust gas at a temperature of about 600° C. passes through the exhaust pipe base in engine startup operation and the dispersoid layer is heated to about 600° C.

Since the inorganic binder has a softening temperature of higher than about 1000° C., it is less likely to soften at about 600° C. In addition, even when the temperature of the dispersoid layer rises after the engine operation shifts to a steady state, it is presumable that the inorganic binder is less likely to soften. Therefore, presumably, the inorganic glass particles and the inorganic particles are more likely to continue to be bound by the inorganic binder, so that the dispersoid layer is less likely to peel from the exhaust pipe base even with engine vibration.

When the temperature of the dispersoid layer reaches the softening temperature (about 700° C.) of the inorganic glass particles, the inorganic glass particles soften and are integrated to form a glass substrate (inorganic glass). Further, presumably, the inorganic particles and the inorganic binder in particulate form are dispersed inside the glass substrate, and a surface coat layer is formed.

As thus described, with use of the above-mentioned exhaust pipe paint, the exhaust pipe can be manufactured by taking advantage of heat of exhaust gas.

In the exhaust pipe manufactured like this, advantageously, the surface coat layer is less likely to drop from the exhaust pipe base upon engine vibration, even under a high-temperature condition in which the temperature of the exhaust pipe reaches about 1000° C. in a steady-state operation of the engine.

The reason for this is presumably as follows.

As above described, the surface coat layer includes a glass substrate in which inorganic particles and an inorganic binder are dispersed in particulate forms. Since the inorganic binder binds the glass substrate and the inorganic particles, the viscosity of the surface coat layer is presumably high.

As a result, the surface coat layer is considered less likely to drop from the exhaust pipe base even with engine vibration under the high-temperature condition.

As above described, when an exhaust pipe is manufactured with use of this exhaust pipe paint, it is presumably necessary to bind inorganic glass particles and inorganic particles with an inorganic binder until the inorganic glass particles soften to form a surface coat layer.

Further, in the manufactured exhaust pipe, it is presumably necessary to maintain the viscosity of the surface coat layer by binding the glass substrate and inorganic particles with the inorganic binder.

Accordingly, the inorganic binder to be used in the exhaust pipe paint is presumably required to have a softening temperature higher than that of the inorganic glass particles, and not to soften at the softening temperature of the inorganic glass particles so as not to be diffused inside the glass substrate.

However, in view of the above-mentioned development trend of engines, the present inventors further made investigations regarding the exhaust pipe paint with an aim of preventing dropping of the surface coat layer under the high temperature condition such as an exhaust gas temperature of about 1000° C. As a result, the present inventors have found that, surprisingly, the following advantages can be achieved by using an exhaust pipe paint including at least one of an inorganic binder partially softening at the softening temperature of the inorganic glass particles and a precursor of the inorganic binder, in addition to the inorganic glass particles and inorganic particles. Namely, use of the exhaust pipe paint allows manufacturing of the exhaust pipe by taking advantage of heat of exhaust gas. Further, the manufactured exhaust pipe is more likely to be excellent in heat resistance and thermal shock resistance, so that dropping of the surface coat layer and occurrence of a crack is more likely to be prevented even under the high-temperature condition.

That is, an exhaust pipe paint according to an embodiment of the present invention for application to an exhaust pipe base includes: an inorganic glass particle; an inorganic particle; and at least one of an inorganic binder partially softening at the softening temperature of the inorganic glass particle and a precursor of the inorganic binder.

By using the exhaust pipe paint according to the embodiment of the present invention, it is easier to manufacture an exhaust pipe excellent in heat resistance and thermal shock resistance and having predetermined heat dissipation, by taking advantage of heat of exhaust gas.

The exhaust pipe paint according to the embodiment of the present invention is applied to the peripheral surface of a cylindrical exhaust pipe base, and a drying treatment is performed to manufacture a painted pipe. The following will discuss an example of a method for manufacturing an exhaust pipe by using the painted pipe.

Figure 2A:
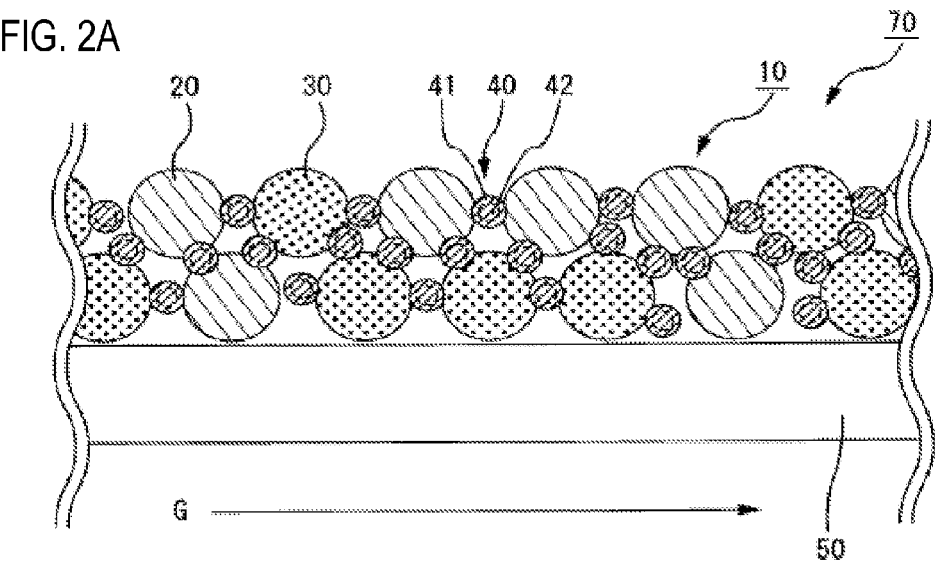
FIG. 2A is a partially enlarged cross-sectional view schematically illustrating a cross section obtained by cutting the painted pipe shown in FIG. 1 along the longitudinal direction thereof.
Figure 2B:
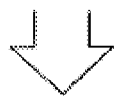
FIG. 2B is a partially enlarged cross-sectional view schematically illustrating a state in which heat of exhaust gas is applied to the painted pipe shown in FIG. 2A.
Figure 2B:
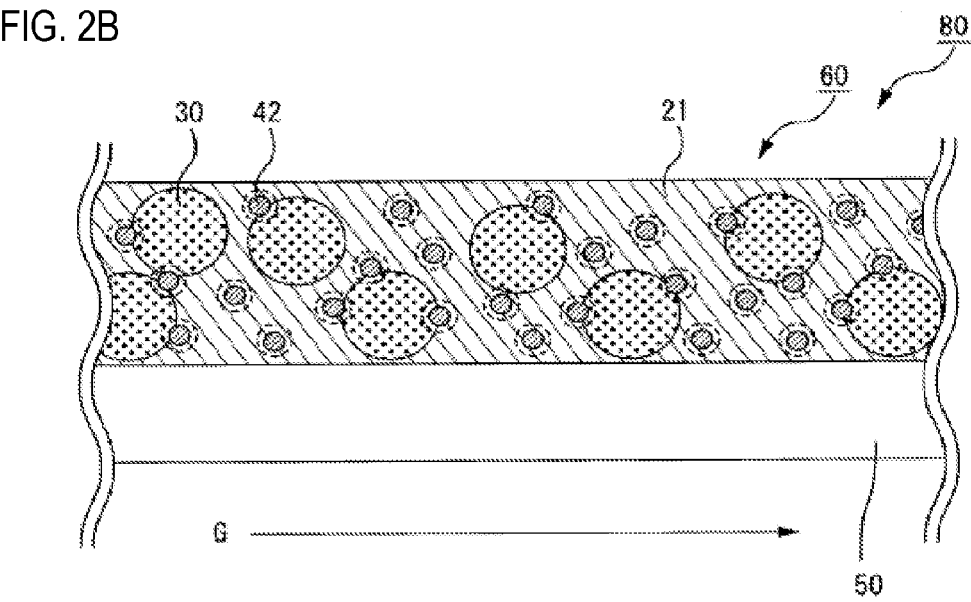

FIG. 1 is a perspective view schematically illustrating an exhaust pipe base (painted pipe) to which an exhaust pipe paint according to the embodiment of the present invention is applied. FIG. 2A is a partially enlarged cross-sectional view schematically illustrating a cross section obtained by cutting the painted pipe shown in FIG. 1 along the longitudinal direction thereof. FIG. 2B is a partially enlarged cross-sectional view schematically illustrating a state in which heat of exhaust gas is applied to the painted pipe shown in FIG. 2A.

In FIG. 1, the symbol G indicates exhaust gas and an arrow indicates the direction in which the exhaust gas flows.

A painted pipe 70 illustrated in FIG. 1 includes: a cylindrical exhaust pipe base 50; and an exhaust pipe paint (dispersoid layer) 10 that is applied to the peripheral surface of the exhaust pipe base 50 to have a predetermined thickness and is dried.

As illustrated in FIG. 2A, the dispersoid layer 10 includes an inorganic binder 40 that binds inorganic glass particles 20 and inorganic particles 30 (note that in the following description, the term "inorganic binder" also includes an inorganic binder obtained by hydrolyzing a precursor of an inorganic binder), and the inorganic glass particles 20 and the inorganic particles 30 are presumably bound by the inorganic binder 40.

Therefore, in the painted pipe 70, the dispersoid layer 10 is more likely to be securely fixed to the exhaust pipe base 50, and the dispersoid layer 10 is less likely to peel.

The following description will discuss an example of the case where the inorganic glass particles 20 have a softening temperature of about 700° C., a part 41 of the inorganic binder 40 softens at the softening temperature of the inorganic glass particles 20, the exhaust gas has a temperature of about 600° C. in engine startup operation, and the exhaust gas has a temperature of about 1000° C. in steady-state operation.

When the painted pipe 70 is attached to an engine (not illustrated) without performing a heating treatment on the painted pipe 70, exhaust gas G having a temperature of about 600° C. passes through the exhaust pipe base 50 in engine startup operation, heat of the exhaust gas G is transferred to the exhaust pipe base 50 and further to the dispersoid layer 10, and the exhaust pipe base 50 and the dispersoid layer 10 are heated to about 600° C.

However, since the inorganic binder 40 presumably softens partially at the softening temperature (700° C.) of the inorganic glass particles 20 and is less likely to soften at a temperature of about 600° C., the inorganic glass particles 20 and the inorganic particles 30 presumably continue to be bound by the inorganic binder 40.

Thus, the dispersoid layer 10 is more likely to fixed continuously to the surface of the exhaust pipe base 50, and it is presumed that the dispersoid layer 10 is less likely to peel from the exhaust pipe base 50 through engine vibration.

Then, after the engine shifts to steady-state operation, the temperature of exhaust gas G that was about 600° C. in startup operation gradually rises to about 1000° C., and the temperature of the dispersoid layer 10 also increases with the rise.

It is supposed that when the temperature of the dispersoid layer 10 reaches about 700° C., the inorganic glass particles 20 having a softening temperature of 700° C. softens and the softened inorganic glass particles 20 are integrated to form a glass substrate (inorganic glass). Concurrently, it is supposed that the part 41 of the inorganic binder 40 softens, so that the part 41 of the softened inorganic binder 40 is diffused in the glass substrate. Further, presumably, the glass substrate with the part 41 of the inorganic binder 40 diffused therein, the inorganic particles 30, and the unsoftened inorganic binder 42 in particulate form are mixed.

Thereby, as illustrated in FIG. 2B, a surface coat layer 60 having the glass substrate 21 in which the part 41 of the inorganic binder 40 is diffused and the inorganic particles 30 and the unsoftened inorganic binder 42 in particulate form are dispersed is formed.

Thus, the dispersoid layer 10 is heated by passing the exhaust gas G through the painted pipe 70, and the surface coat layer 60 can be formed on the peripheral surface of the exhaust pipe base 50.

That is, in the exhaust pipe paint according to the embodiment of the present invention, by taking advantage of the heat of exhaust gas G, an exhaust pipe 80 having the surface coat layer 60 formed on the peripheral surface of the exhaust pipe base 50 can be manufactured. The surface coat layer 60 includes the glass substrate 21 in which the part 41 of the softened inorganic binder 40 is diffused and the inorganic particles 30 and the unsoftened inorganic binder 42 in particulate form are dispersed.

The manufactured exhaust pipe 80 is more likely to be excellent in heat resistance. The reason for this is described in the following.

The part 41 of the inorganic binder 40 diffused in the glass substrate 21 presumably functions as a dopant. Therefore, the softening temperature of the glass substrate 21 is more likely to be higher than that of a glass substrate in which a part of an inorganic binder is not diffused. As a result, the surface coat layer 60 is more likely to have a high softening temperature.

In addition, the surface coat layer 60 presumably has the glass substrate 21 in which the inorganic particles 30 and the unsoftened inorganic binder 42 in particulate form are dispersed. The unsoftened inorganic binder 42 presumably binds the glass substrate 21 and the inorganic particles 30. Therefore, the surface coat layer 60 is more likely to have a higher viscosity compared to a surface coat layer in which an inorganic binder is not dispersed. This also is more likely to raise the softening temperature of the surface coat layer 60.

Namely, an effect as a dopant of the part 41 of the inorganic binder 40 diffused in the glass substrate 21 and a binding property of the unsoftened inorganic binder 42 dispersed inside the glass substrate 21 presumably work synergistically to raise the softening temperature of the surface coat layer 60. As a result, presumably, the viscosity of the surface coat layer 60 is less likely to be lowered even under the high temperature condition such as a temperature exceeding about 1000° C. in the exhaust pipe. Further, presumably, the surface coat layer 60 is less likely to drop from the exhaust pipe base 50 even with the engine vibration.

Consequently, the exhaust pipe 80 is considered to be more likely to be excellent in heat resistance.

Even thermal shock is caused by repeated heating and cooling of the exhaust pipe 80 by start and stop of the engine, the high viscosity of the surface coat layer 60 is more likely to prevent an occurrence of a crack in the surface coat layer 60.

Accordingly, the exhaust pipe 80 is more likely to be excellent in thermal shock resistance.

The exhaust pipe paint 10 according to the embodiment of the present invention includes inorganic particles 30.

Therefore, when a material having a comparatively high emissivity is used as the inorganic particles 30, heat is efficiently radiated from the inorganic particles 30 in comparison with the case where the exhaust pipe paint does not include the inorganic particles 30. Thus, in the exhaust pipe 80 manufactured by using the exhaust pipe paint according to the embodiment of the present invention, since the heat of exhaust gas G that has flowed in the exhaust pipe 80 is transmitted to the exhaust pipe 80 and the heat transmitted to the exhaust pipe 80 is more likely to be efficiently radiated to the outside through the surface coat layer 60 (inorganic particles 30), the temperature of the exhaust gas G that flows out of the exhaust pipe 80 easily falls.

As a result, even under the high temperature condition that the exhaust gas exceeds a temperature of about 1000° C., the temperature of the exhaust gas G that flows out of the exhaust pipe 80 is less likely to exceed the upper limit of a catalyst activation temperature.

On the other hand, when a material having a comparatively low emissivity is used as inorganic particles, heat is less likely to be radiated from the inorganic particles. Therefore, by using the exhaust pipe paint for an exhaust pipe for an engine, such as a diesel engine that emits exhaust gas having a comparatively low temperature, it is easier to prevent the temperature of the exhaust gas from being less than the lower limit of a catalyst activation temperature.

The exhaust pipe paint according to the embodiment of the present invention preferably contains the inorganic binder including at least one of silicon and aluminum.

The exhaust pipe paint according to the embodiment of the present invention preferably contains the precursor of the inorganic binder including at least one of silicon alkoxide and aluminum alkoxide.

Use of the inorganic binder or the precursor of the inorganic binder is more likely to provide suitably an effect of the exhaust pipe paint according to the embodiment of the present invention.

The exhaust pipe paint according to the embodiment of the present invention preferably includes the inorganic glass particle having a softening temperature of about 300° C. to about 1000° C.

In accordance with the exhaust pipe paint according to the embodiment of the present invention, the inorganic glass particles preferably have a softening temperature of from about 300° C. to about 1000° C., and the temperature of the exhaust gas in the process of the engine shifting from startup operation to steady-state operation (for example, about 600 to 1000° C.) is not so different from the softening temperature of the inorganic glass particles. Therefore, in the process of the engine shifting from startup operation to steady-state operation, it is easier to soften the inorganic glass particles by using heat of exhaust gas. Moreover, the viscosity of the softened inorganic glass particles is less likely to become too low, and the dispersoid layer is less likely to peel from the exhaust pipe base before the formation of the surface coat layer.

Thus, the effect of the exhaust pipe paint according to the embodiment of the present invention is more likely to be suitably exerted.

On the other hand, when the inorganic glass particles have a softening temperature of lower than about 300° C., the softening temperature of the inorganic glass particles is significantly lower than the temperature of the exhaust gas in the process of the engine shifting from startup operation to steady-state operation. Therefore, in the process of the engine shifting from startup operation to steady-state operation, the viscosity of the softened inorganic glass particles tends to become too low, and the dispersoid layer is more likely to peel from the exhaust pipe base before the formation of the surface coat layer. Thus, it may be difficult to form the surface coat layer.

When the softening temperature of the inorganic glass particles exceeds about 1000° C., the softening temperature of the inorganic glass particles is far higher than the temperature (about 1000° C.) of the exhaust gas in engine steady-state operation. Accordingly, it may be difficult to form the surface coat layer by taking advantage of heat of exhaust gas.

In the exhaust pipe paint according to the embodiment of the present invention, a blending ratio of the inorganic glass particle, the inorganic particle, and at least one of the inorganic binder and the precursor of the inorganic binder is preferably from about 6:4:3 to about 6:4:10 (inorganic glass particle: inorganic particles: at least one of inorganic binder and precursor of the inorganic binder) in a weight ratio.

In the exhaust pipe paint according to the embodiment of the present invention, the blending ratio is from about 6:4:3 to about 6:4:10 in a weight ratio. Such a blending ratio tends to further enhance heat resistance and thermal shock resistance of the manufactured exhaust pipe.

When the amount of at least one of the inorganic binder and the precursor of the inorganic binder is less than the lower limit in the blending ratio, flaking of the exhaust pipe paint and dropping of the surface coat layer are more likely to occur in the manufactured exhaust pipe. The reason for this is that the amount of the inorganic binder for binding inorganic glass particles (glass substrate) and inorganic particles tends to be small.

On the other hand, when the amount of at least one of the inorganic binder and the precursor of the inorganic binder is more than the upper limit in the blending ratio, a crack is more likely to occur in the surface coat layer of the manufactured exhaust pipe. The reason for this is not clear, but it is presumably because of low thermal expansion coefficient of the entire surface coat layer containing a large amount of the inorganic binder. Since the thermal expansion coefficient of the unsoftened inorganic binder contained in the surface coat layer is lower than that of the glass substrate, the thermal expansion coefficient of the entire surface coat layer tends to be lowered.

In the exhaust pipe paint according to the embodiment of the present invention, the exhaust pipe paint preferably has an emissivity of about 0.7 or more after a drying treatment.

The exhaust pipe paint has a comparatively high emissivity of about 0.7 or more after a drying treatment.

In the exhaust pipe paint, the inorganic particle preferably includes at least one oxide of manganese, iron, copper, cobalt, and chromium.

In the exhaust pipe paint, a material whose emissivity is comparatively high among inorganic materials is used as inorganic particles.

For this reason, even when hot exhaust gas flows in an exhaust pipe using the exhaust pipe paint, since heat of exhaust gas is more likely to be efficiently radiated to the outside through the surface coat layer (inorganic particles), the temperature of the exhaust gas discharged from the exhaust pipe easily falls and is easily controlled within the range of a catalyst activation temperature.

A method for producing an exhaust pipe according to the embodiment of the present invention includes: applying the exhaust pipe paint according to the embodiment of the present invention to the exhaust pipe base to manufacture a painted pipe; attaching the painted pipe to an exhaust port of an engine; and discharging exhaust gas at a temperature higher than the softening temperature of the inorganic glass particles from the exhaust port of the engine and thereby passing the exhaust gas through the painted pipe.

The method for producing an exhaust pipe according to the embodiment of the present invention includes: attaching to the exhaust port of the engine the painted pipe that is painted with the exhaust pipe paint according to the embodiment of the present invention; and passing the exhaust gas discharged from the exhaust port through the painted pipe.

Thereby, it is easier to manufacture an exhaust pipe excellent in heat resistance and thermal shock resistance and having predetermined heat dissipation by taking advantage of heat of exhaust gas without performing a heating treatment. The reason for this is omitted because it is given in the description of the exhaust pipe paint according to the embodiment of the present invention.

In the process of manufacturing the exhaust pipe, since there is no necessity of performing a heating treatment that requires high energy, it is easier to reduce the environmental impact while controlling the emission amount of $CO_2$ and the like.

An exhaust pipe according to the embodiment of the present invention includes: an exhaust pipe base; and a surface coat layer formed on the exhaust pipe base, wherein the surface coat layer includes an inorganic glass, an inorganic particle and an inorganic binder, and in the inorganic glass, a part of the inorganic binder is diffused and the inorganic particle and the rest of the inorganic binder in particulate form are dispersed.

In the exhaust pipe according to the embodiment of the present invention, as discussed in the description of the exhaust pipe paint according to the embodiment of the present invention, in the inorganic glass (glass substrate) in the surface coat layer, a part of the inorganic binder is diffused and the inorganic particles and the rest of inorganic binder in particulate form are dispersed (see FIG. 2B).

Therefore, in the exhaust pipe according to the embodiment of the present invention, an effect as a dopant of a part of the inorganic binder diffused in the glass substrate and a binding property of the unsoftened inorganic binder dispersed inside the glass substrate work synergistically. As a result, the exhaust pipe is more likely to be excellent in heat resistance and thermal shock resistance.

Accordingly, even under the high-temperature condition such as the temperature of the exhaust pipe exceeding about 1000° C., the viscosity of the surface coat layer is less likely to fall, the surface coat layer is less likely to drop from the exhaust pipe base even with engine vibration, and a crack is less likely to occur in the surface coat layer.

In the exhaust pipe according to the embodiment of the present invention, the surface coat layer includes inorganic particles.

Therefore, when a material having a comparatively high emissivity is used as the inorganic particles, heat is more likely to be radiated efficiently from the inorganic particles in comparison with the case where the surface coat layer does not include the inorganic particles. Thus, since the heat of exhaust gas that has flowed in the exhaust pipe is more likely to be transmitted to the exhaust pipe, and the heat transmitted to the exhaust pipe is more likely to be radiated efficiently to the outside through the surface coat layer (inorganic particles), the temperature of the exhaust gas that flows out of the exhaust pipe easily falls.

Accordingly, even under the high-temperature condition such as the temperature of the exhaust gas exceeding about 1000° C., the temperature of the exhaust gas that flows out of the exhaust pipe is less likely to exceed the upper limit of a catalyst activation temperature.

On the other hand, when a material having a comparatively low emissivity is used as inorganic particles, heat is less likely to be radiated from inorganic particles. Therefore, when the exhaust pipe is attached to a diesel engine or the like that emits exhaust gas having a comparatively low temperature, it is easier to prevent the temperature of exhaust gas from being less than the lower limit of a catalyst activation temperature.

The exhaust pipe according to the embodiment of the present invention preferably contains the inorganic binder including at least one of silicon and aluminum.

The exhaust pipe according to the embodiment of the present invention preferably contains the inorganic glass having a softening temperature of higher than about 300° C.

Even in the exhaust pipe having such a structure, the effect of the exhaust pipe according to the embodiment of the present invention is more likely to be suitably exerted.

In the exhaust pipe according to the embodiment of the present invention, a weight ratio of the inorganic glass, the inorganic particle, and the inorganic binder is preferably from about 6:4:3 to about 6:4:10.

The exhaust pipe is more likely to be excellent in heat resistance and thermal shock resistance, as described in the explanation of the exhaust pipe paint according to the embodiment of the present invention.

In the exhaust pipe according to the embodiment of the present invention, the surface coat layer preferably has an emissivity of about 0.7 or higher. The exhaust pipe base has a comparatively high emissivity of about 0.7 or higher.

In the exhaust pipe according to the embodiment of the present invention, the inorganic particle preferably includes at least one oxide of manganese, iron, copper, cobalt, and chromium.

In the exhaust pipe, a material having a comparatively high emissivity is used as the inorganic particles contained in the surface coat layer, among inorganic materials.

Therefore, in the exhaust pipe, as discussed in the description of the effect of the exhaust pipe paint according to the embodiment of the present invention, it is easier to reduce the temperature of the exhaust gas discharged from the exhaust pipe and control the temperature within the range of a catalyst activation temperature.

First Embodiment

The following will discuss a first embodiment, one embodiment of the present invention.

First, the exhaust pipe paint of the present embodiment will be described.

The exhaust pipe paint of the present embodiment includes inorganic glass particles, inorganic particles, and at least one of an inorganic binder and a precursor of the inorganic binder, the inorganic binder partially softening at the softening temperature of the inorganic glass particles.

The inorganic glass particles preferably have a softening temperature of from about 300° C. to about 1000° C.

The inorganic particle preferably includes at least one oxide of manganese, iron, copper, cobalt, and chromium. The exhaust pipe paint preferably has an emissivity of about 0.7 or more after a drying treatment.

The inorganic binder preferably includes at least one of silicon and aluminum. The inorganic binder can bind the inorganic glass particles and the inorganic particles.

Examples of the inorganic binder include: silica sol, alumina sol, and silica-alumina sol; an inorganic binder, which is derived from a precursor of an inorganic binder to be mentioned later; and the like.

The precursor of an inorganic binder is not particularly limited as long as it can be changed to the inorganic binder by hydrolysis, a heating treatment, or the like, and examples of the inorganic binder include: silicon alkoxide such as silicon tetramethoxide, silicon tetraethoxide, silicon tetrabutoxide, silicon tetraisopropoxide, siliconphenyl trimethoxide, silicon triethoxide, silicon diethoxide, silicon diethoxy dimethyl, silicon-3-aminopropyltriethoxide, silicon benzyltriethoxide, silicon-3-chloropropyldimethoxide, and silicon diethoxydichloride; and aluminum alkoxide such as aluminum trimethoxide, aluminum triethoxide, aluminum dimethoxide, aluminum diethoxyethyl, aluminum diethoxyphenyl, aluminum tetraisopropoxide, aluminum triisopropoxide, and aluminum triethoxide.

The blending ratio of inorganic glass particles, inorganic particles, and at least one of an inorganic binder and a precursor of an inorganic binder is not particularly limited. The preferable blending ratio is from about 6:4:3 to about 6:4:10 (inorganic glass particles: inorganic particles: at least one of inorganic binder and precursor of the inorganic binder) in a weight ratio. The reason for this has been already given in the explanation of the exhaust pipe paint according to the embodiment of the present invention, and therefore, it is omitted here.

The following will discuss the painted pipe of the present embodiment.

The painted pipe of the present embodiment includes: a cylindrical exhaust pipe base mainly made of metal; and an exhaust pipe paint of the present embodiment that has been applied to the substantially entire peripheral surface of the exhaust pipe base to have a predetermined thickness and then dried.

Since the detailed configuration of the painted pipe of the present embodiment is described with reference to FIG. 1 and FIG. 2A, description thereof will be omitted.

Examples of the material of the exhaust pipe base include: metals, such as stainless steel, steel, iron, and copper; nickel alloys, such as Inconel, Hastelloy, and Invar; and the like. Since these metal materials have high thermal conductivity, they are more likely to contribute to improvement in heat dissipation of the exhaust pipe with the use of the painted pipe.

The peripheral surface of the exhaust pipe base is a roughened surface on which irregularities are formed.

The maximum height Rz of the irregularities on the roughened surface is desirably from about 1.5 μm to about 15 μm.

When the maximum height Rz of the irregularities on the peripheral surface of the exhaust pipe base is from about 1.5 μm to about 15 μm, adhesion is more likely to be strong between the exhaust pipe base and the exhaust pipe paint (dispersoid layer) or the surface coat layer.

On the other hand, when the maximum height Rz is less than about 1.5 μm, since the surface area tends to be small, adhesion tends to be insufficient between the exhaust pipe base and the exhaust pipe paint (dispersoid layer) or the surface coat layer.

When the maximum height Rz exceeds about 15 μm, an exhaust pipe paint (dispersoid layer) or a surface coat layer is less likely to be certainly formed on the surface of an exhaust pipe base. This is presumably because when the maximum height Rz is too large, the exhaust pipe paint is less likely to fill the depressions of the irregularities formed on the surface of the exhaust pipe base and gaps tends to be formed in the depressions.

The maximum height Rz is more desirably from about 3.0 μm to about 14 μm, and further desirably from about 3.5 μm to about 13 μm.

The maximum height Rz is calculated in conformity with JIS B 0601. The content of JIS B 0601 is incorporated herein by reference in its entirety.

When conditions such as the material of the exhaust pipe base make it possible to prevent the exhaust pipe paint from dropping, the roughened surface is not necessarily formed.

Examples of a method for roughening the peripheral surface of the exhaust pipe base include roughening treatments, such as a sandblast treatment, an etching treatment, and a high-temperature oxidation treatment. These roughening treatments may be performed independently or two or more thereof may be performed in combination.

The following will discuss a method for manufacturing an exhaust pipe paint of the present embodiment (process 1), a method for manufacturing a painted pipe of the present embodiment (process 2), and a method for producing an exhaust pipe according to the present embodiment (process 3). The exhaust pipe of the present embodiment can be manufactured through the below-described processes 1 to 3.

1. Method for Manufacturing Exhaust Pipe Paint (1-1) Inorganic glass particles are dry mixed with inorganic particles at a predetermined blending ratio to prepare mixed powder.

Here, the inorganic glass particles may be manufactured by grinding coarse powder of the inorganic glass to have a predetermined particle size, shape, and the like by virtue of a ball mill or the like. The inorganic particles may be manufactured by grinding coarse powder of a predetermined inorganic material to have a predetermined particle size, shape, and the like by virtue of a ball mill or the like.

(1-2) A predetermined amount of at least one of silica sol as an inorganic binder and silicon alkoxide as a precursor of the inorganic binder are weighed and added to the mixed powder. The obtained mixture was wet mixed to manufacture an exhaust pipe paint.

2. Method for Manufacturing Painted Pipe (2-1) A roughening treatment is performed on the surface of the exhaust pipe base, and irregularities are formed on the surface of the exhaust pipe base to give a roughened surface.

(2-2) Next, the exhaust pipe paint manufactured in (1-2) is substantially uniformly applied to the surface of the roughened exhaust pipe base by spray coating.

(2-3) After performing a pre-drying treatment, at room temperature for several minutes to tens of hours, on the exhaust pipe base, to which the exhaust pipe paint has been applied, a drying treatment is performed on the exhaust pipe base in a drying apparatus at a temperature of from about 50° C. to about 300° C. for about 10 minutes to about 1 hour to manufacture a painted pipe.

3. Method for Producing Exhaust Pipe

In the method for producing an exhaust pipe according to the present embodiment, an exhaust pipe can be manufactured by taking advantage of heat of exhaust gas without performing a heating treatment.

The following will discuss a method for producing an exhaust pipe according to the present embodiment with reference to drawings by exemplifying the case of manufacturing an exhaust manifold to be attached to an automobile engine by the method for producing an exhaust pipe according to the present embodiment.

Figure 3:
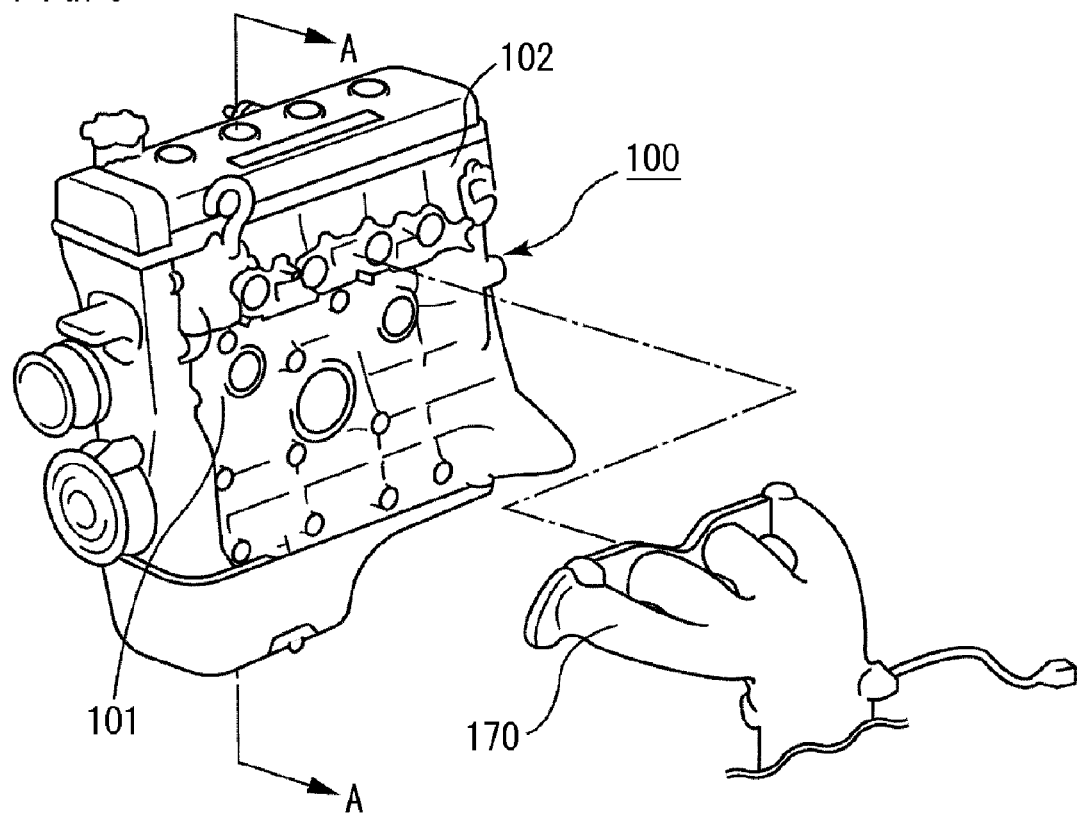
FIG. 3 is an exploded perspective view schematically illustrating an automobile engine and a painted pipe of a first embodiment to be attached to the automobile engine.

FIG. 3 is an exploded perspective view schematically illustrating an automobile engine and a painted pipe of the present embodiment to be attached to the automobile engine.

Figure 4A:
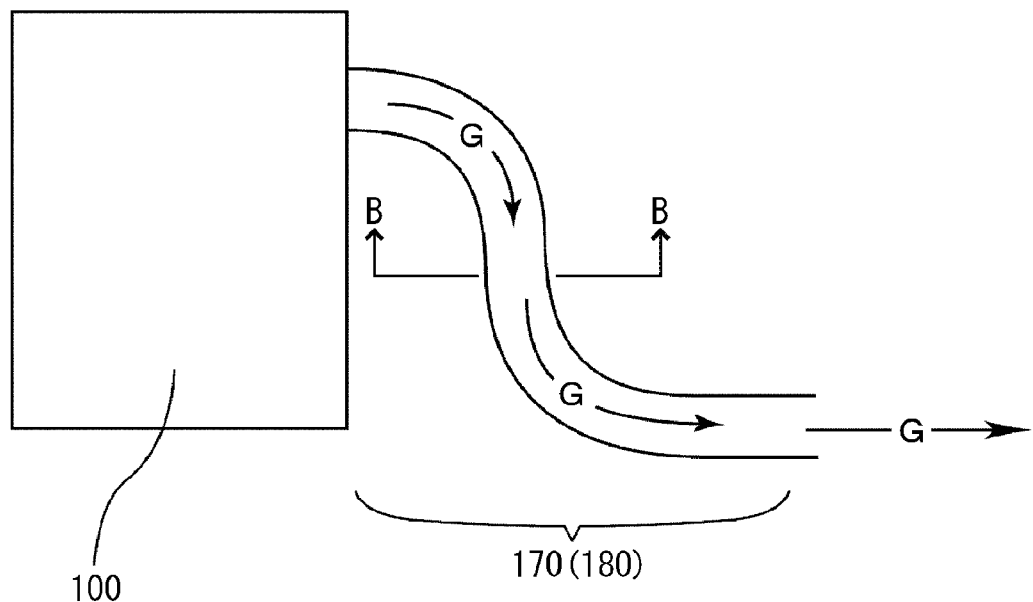
FIG. 4A is an A-A line cross-sectional view of the automobile engine and the painted pipe (exhaust pipe) shown in FIG. 3.
Figure 4B:
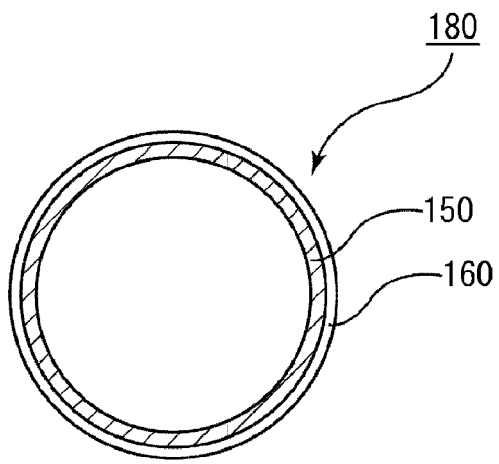
FIG. 4B is a B-B line cross-sectional view of the painted pipe (exhaust pipe) shown in FIG. 4A.

FIG. 4A is an A-A line cross-sectional view of the automobile engine and the painted pipe (exhaust pipe) shown in FIG. 3, and FIG. 4B is a B-B line cross-sectional view of the painted pipe (exhaust pipe) shown in FIG. 4A.

In FIG. 4A, the symbol G indicates exhaust gas and an arrow indicates the direction in which the exhaust gas flows.

(3-1) According to the processes 1 and 2, the exhaust pipe paint is applied to the base for an exhaust manifold to manufacture a painted pipe for an exhaust manifold and then dried.

The manufactured painted pipe for an exhaust manifold is attached to an exhaust port of an automobile engine.

Specifically, as illustrated in FIG. 3, one end of a painted pipe 170 for an exhaust manifold is attached to one side face of a cylinder head 102 provided on the top of a cylinder block 101 of an automobile engine 100.

Attachment of the painted pipe 170 for an exhaust manifold allows exhaust gases to collect from the respective cylinders.

The automobile engines are not particularly limited, and in the present embodiment, conventionally known automobile engines in which the exhaust gas has a temperature of about 600° C. in startup operation and has a temperature of about 1000° C. in steady-state operation are used as the automobile engines.

Conventionally known catalytic converters or the like may be attached, if necessary, to the other end of the base (not illustrated) for an exhaust manifold.

(3-2) Subsequently, an automobile engine is operated. Thereby, as illustrated in FIG. 4(a), exhaust gas G discharged from the automobile engine 100 passes through the painted pipe 170 for an exhaust manifold.

(3-3) A surface coat layer is formed by keeping, for about 10 minutes to about 1 hour, a temperature of the exhaust gas of from about 300° C. to about 1000° C., the temperature equal to or higher than the softening temperature of the inorganic glass particles.

Since the detailed process of forming a surface coat layer by heat of exhaust gas is described with reference to FIG. 1, FIG. 2A and FIG. 2B, description thereof will be omitted.

Through the above processes, an exhaust manifold 180 can be manufactured from the painted pipe 170 for an exhaust manifold by taking advantage of the heat of exhaust gas.

Here, an exhaust pipe has been described that can be manufactured by attaching the painted pipe to the engine exhaust port and taking advantage of the heat of exhaust gas. Additionally, an exhaust manifold 180 can also be manufactured by heating the painted pipe 170 for an exhaust manifold by virtue of a heating furnace or the like for about 10 minutes to about 1 hour at a temperature of from about 300° C. to about 1000° C., the temperature exceeding the softening temperature of the inorganic glass particles.

As illustrated in FIG. 4B, the exhaust pipe of the present embodiment manufactured through the processes 1 to 3 is the exhaust pipe 180 including an exhaust pipe base 150 and a surface coat layer 160 formed on the peripheral surface of the exhaust pipe base 150. The surface coat layer 160 includes an inorganic glass, inorganic particles, and an inorganic binder. In the inorganic glass, a part of inorganic binder is diffused and the inorganic particles and the rest of the inorganic binder in particulate form are dispersed.

The inorganic glass has a softening temperature higher than about 300° C.

The inorganic particles are at least one oxide of manganese, iron, copper, cobalt, and chromium. The surface coat layer has an emissivity of about 0.7 or higher.

When the exhaust pipe paint containing inorganic glass particles, inorganic particles and at least one of an inorganic binder and a precursor of the inorganic binder in a weight ratio of from about 6:4:3 to about 6:4:10 is used, the obtained surface coat layer contains inorganic glass, inorganic particles and inorganic binder in a weight ratio of from about 6:4:3 to about 6:4:10.

The following will discuss the effects of the exhaust pipe paint according to the present embodiment, of a method for producing an exhaust pipe, and of the exhaust pipe. It is to be noted that since the effect of the method for producing an exhaust pipe according to the present embodiment is the same as the effect of the exhaust pipe paint of the present embodiment, description thereof will be omitted.

(1) The exhaust pipe paint of the present embodiment includes: inorganic glass particles whose softening temperature is from about 300° C. to about 1000° C.; inorganic particles; and an inorganic binder (precursor of the inorganic binder) partially softening at the softening temperature of the inorganic glass particles, wherein the inorganic glass particles and the inorganic particles are bound by the inorganic binder. Therefore, the exhaust pipe paint of the present embodiment is more likely to be fixed securely to an exhaust pipe base after the drying treatment.

When the exhaust pipe base to which the exhaust pipe paint of the present embodiment has been applied is attached to an engine exhaust port without performing a heating treatment on the exhaust pipe base, exhaust gas G having a temperature of about 600° C. passes through the exhaust pipe base in engine startup operation, and an dispersoid layer is presumably heated to about 600° C.

Since the inorganic binder presumably softens partially at the softening temperature (from about 300° C. to about 1000° C.) of the inorganic glass particles, it is less likely to completely soften at about 600° C. Even when the temperature of the dispersoid layer reaches about 600° C. or rises higher after the engine shifts to steady-state operation, it is less likely to completely soften.

Therefore, the inorganic glass particles and the inorganic particles are more likely to continue to be bound by the inorganic binder, and it is presumed that the dispersoid layer is less likely to peel from the exhaust pipe base even with engine vibration.

On the other hand, when the temperature of the dispersoid layer reaches the softening temperature of the inorganic glass particles (from about 300° C. to about 1000° C.), presumably, inorganic glass particles soften and are integrated to form a glass substrate (inorganic glass). Concurrently, a part of the inorganic binder also softens and is presumably diffused in the glass substrate. Further, in the glass substrate in which a part of the inorganic binder is diffused, the inorganic particles, and the unsoftened inorganic binder in particulate form are presumably dispersed.

Thus, a surface coat layer having the glass substrate in which a part of the inorganic binder is dispersed and the inorganic particles and the unsoftened inorganic binder in particulate form are dispersed is presumably formed.

As thus described, in the exhaust pipe paint of the present embodiment, the exhaust pipe can be manufactured by using heat of exhaust gas.

(2) With the exhaust pipe paint of the present embodiment, an exhaust pipe can be manufactured by taking advantage of the heat of exhaust gas without performing a heating treatment that requires high energy.

Therefore, it is easier to reduce the environmental impact by controlling the emission amount of $CO_2$ and the like.

(3) In the exhaust pipe of the present embodiment, the part of the inorganic binder diffused inside the glass substrate (inorganic glass) presumably functions as a dopant in the surface coat layer. Therefore, the glass substrate is more likely to have a softening temperature higher than that of a glass substrate in which a part of the inorganic binder is not diffused.

In addition, in the surface coat layer, the inorganic particles and the unsoftened inorganic binder in particulate form are presumably dispersed inside the glass substrate and the unsoftened inorganic binder presumably binds the glass substrate and the inorganic particles.

Accordingly, the surface coat layer is more likely to have higher viscosity compared to a surface coat layer in which the inorganic binder is not dispersed. This also is more likely to make the softening temperature higher.

Namely, an effect as a dopant of the part of the inorganic binder diffused inside the glass substrate and a binding property of the unsoftened inorganic binder work synergistically. Therefore, the viscosity of the surface coat layer is less likely to be lowered even under the high temperature condition such as a temperature exceeding about 1000° C. in the exhaust pipe. Further, the surface coat layer is less likely to drop from the exhaust pipe base even with engine vibration. Accordingly, the exhaust pipe of the present embodiment is more likely to be excellent in heat resistance.

Further, even the thermal shock is caused by repeated heating and cooling of the exhaust pipe by start and stop of engine, the high viscosity of the surface coat layer is likely to prevent an occurrence of a crack in the surface coat layer. Accordingly, the exhaust pipe of the present embodiment is more likely to be excellent in thermal shock resistance.

When the exhaust pipe paint containing inorganic glass particles, inorganic particles and at least one of an inorganic binder and a precursor of an inorganic binder in a weight ratio of from about 6:4:3 to about 6:4:10 is used, the surface coat layer of the manufactured exhaust pipe contains inorganic glass, inorganic particles and inorganic binder in a weight ratio of from about 6:4:3 to about 6:4:10. Consequently, the exhaust pipe is more likely to be excellent in heat resistance and thermal shock resistance as described above.

(4) In the exhaust pipe of the present embodiment, the surface coat layer includes inorganic particles that have a comparatively high emissivity among the inorganic materials. The inorganic particles contain at least one oxide of manganese, iron, copper, cobalt, and chromium. The surface coat layer has an emissivity of about 0.7 or more.

Therefore, in the exhaust pipe of the present embodiment, even when hot exhaust gas flows in the exhaust pipe in steady-state operation and high-speed operation of the engine, heat of exhaust gas is more likely to be radiated efficiently to the outside through the surface coat layer (inorganic particles).

15

Accordingly, the temperature of the exhaust gas discharged from the exhaust pipe easily falls and is easily controlled within the range of a catalyst activation temperature.

EXAMPLES

The following will describe Examples in which the first embodiment of the present invention is more specifically disclosed, and the present embodiment is not intended to be limited only by these Examples.

EXAMPLES

Example 1

An exhaust pipe paint was manufactured by the below process 1 and a painted pipe sample was manufactured through the below process 2. Further, an exhaust pipe sample was manufactured by the below process 4.

1. Manufacture of Exhaust Pipe Paint (1-1) As inorganic glass particles, 60 parts by weight of a $B_2O_3$—$Bi_2O_3$ type glass powder (BAS115 manufactured by Asahi Glass Co., Ltd.) having a softening temperature of 400° C. was weighed. Separately, as inorganic particles, 30 parts by weight of $MnO_2$ powder, 5 parts by weight of FeO powder, and 5 parts by weight of CuO powder were weighed. These powders were dry mixed to manufacture mixed powder.

(1-2) As a mixture of an inorganic binder and a precursor of the inorganic binder, 70 parts by weight of HAS-6 (product of COLCOAT CO., LTD.) was added to 100 parts by weight of the mixed powder. The obtained mixture was wet mixed to manufacture an exhaust pipe paint.

It is to be noted that HAS-6 is hydrolyzed silicon tetraethoxide. Silicon tetraethoxide is hydrolyzed to produce a silanol compound, and then, the compound is partially dehydration-condensed to produce an oligomer. The oligomer is considered to function as an inorganic binder. Accordingly, HAS-6 is considered to contain the oligomer as an inorganic binder and silicon tetraethoxide as a precursor of the inorganic binder which is not hydrolyzed.

The oligomer presumably starts softening at about 400° C. and does not completely soften at the temperature higher than about 1000° C.

2. Manufacture of Painted Pipe Sample (2-1) An exhaust pipe base having a plate shape (100 mm in width, 100 mm in length, and 2 mm in thickness) and made of stainless steel (SUS430) was prepared. The exhaust pipe base was ultrasonically cleaned in an alcohol solvent. Then, a sandblast treatment was carried out on the peripheral surface of the exhaust pipe base to give a roughened surface.

Here, the sandblast treatment was performed for 10 minutes using #100 $Al_2O_3$ abrasive grains.

(2-2) Next, 0.3 g of the exhaust pipe paint manufactured in the process (1-2) was uniformly applied to the surface of the sandblasted exhaust pipe base by spray coating.

(2-3) After performing a pre-drying treatment on the exhaust pipe base to which the exhaust pipe paint was applied, at room temperature for 24 hours, the painted pipe sample was manufactured by performing a drying treatment at 60° C. for 20 minutes in a drying apparatus.

3. Evaluation of Painted Pipe Sample
(Evaluation on Emissivity)

The emissivity of a painted pipe sample was measured by using an emissivity meter D&S AERD manufactured by Kyoto Electronics Manufacturing Co., Ltd.

The obtained emissivity of the painted pipe sample was 0.80.

16

(Evaluation on Peeling of Dispersoid Layer)

The painted pipe sample was disposed on a Dupont-type impact tester (Dupont impact tester manufactured by TP Giken), and a 500-g weight was dropped on the painted pipe sample from a height of 400 mm. In this manner, the presence of peeling of a dispersoid layer upon the weight drop impact was evaluated.

As a result, peeling of the dispersoid layer did not occur in the painted pipe sample manufactured in Example 1.

Then, an exhaust pipe sample was manufactured by using the painted pipe sample manufactured in the process (2-3). Description of manufacture of the exhaust pipe sample will be given.

4. Manufacture of Exhaust Pipe Sample

The painted pipe sample manufactured in the process (2-3) was heated in a heating furnace at a temperature of 400° C. for 10 minutes to manufacture an exhaust pipe sample.

In the manufactured exhaust pipe sample, the thickness of the surface coat layer was 5 μm.

5. Evaluation of Exhaust Pipe Sample
(Evaluation on Emissivity)

In the same manner as in the evaluation on the emissivity of the painted pipe sample, the emissivity of the surface coat layer in the exhaust pipe sample was also evaluated.

As a result, the emissivity of the surface coat layer of the exhaust pipe sample manufactured in Example 1 was 0.81.

(Evaluation on Dropping of Surface Coat Layer)

The exhaust pipe sample manufactured in the process 4 mentioned above was tilted 60° when placed in the heat furnace having a temperature of 1100° C. and was maintained in this state for 60 minutes. Then, dropping of the surface coat layer on the surface of the exhaust pipe base was evaluated.

As a result, the surface coat layer did not drop from the painted pipe sample manufactured in Example 1.

(Evaluation on Thermal Shock Resistance)

The exhaust pipe sample manufactured from the painted pipe sample by heating in the heating furnace in the process 4 was put into water at 25° C. without being cooled. Then, the presence of a crack in the surface coat layer was evaluated.

As a result, a crack was not present in the surface coat layer of the exhaust pipe sample manufactured in Example 1.

Examples 2 to 8, Reference Examples 1 and 2

Exhaust pipe paints, painted pipe samples, and exhaust pipe samples were respectively manufactured in the same manner as in Example 1, except the following. Inorganic glass particles having the different softening temperature were used in the process (1-1) of Example 1 (Examples 4 to 6). The blending ratios of inorganic glass particles, inorganic particles, and HAS-6 were changed (Examples 7 and 8, Reference Examples 1 and 2). The heating temperatures of the painted pipe samples were changed in the process 4 in Example 1 (Examples 2 to 8, Reference Examples 1 and 2). These are shown in Table 1.

It is to be noted that the surface coat layer was 5 μm in thickness in any of the manufactured exhaust pipe samples.

Comparative Example 1

An exhaust pipe paint, a painted pipe sample, and an exhaust pipe sample were manufactured in the same manner as in Example 1, except that in the process (1-2) of Example 1, 70 parts by weight of water instead of HAS-6 was added to mixed powder, and then mixed.

In the manufactured exhaust pipe sample, the thickness of the surface coat layer was 5 μm.

Comparative Example 2

An exhaust pipe paint, a painted pipe sample, and an exhaust pipe sample were manufactured in the same manner as in Example 1, except that in the process (1-2) of Example 1, as an organic binder instead of HAS-6, a methyl cellulose solution manufactured by mixing 0.9 parts by weight of methyl cellulose and 70 parts by weight of water was added to mixed powder, and then mixed.

In the manufactured exhaust pipe sample, the thickness of the surface coat layer was 5 μm.

Comparative Example 3

An exhaust pipe paint, a painted pipe sample, and an exhaust pipe sample were manufactured in the same manner as in Example 1, except that 70 parts by weight of lithium alkoxide, instead of HAS-6, was added to the mixed powder, and then mixed in the process (1-2) of Example 1.

The surface coat layer was 5 μm in thickness in the manufactured exhaust pipe sample.

It is to be noted that lithium alkoxide is considered to be partially dehydration-condensed to produce an oligomer, when hydrolyzed. The oligomer is considered to function as an inorganic binder. However, since the oligomer has a softening temperature higher than about 1000° C., it does not soften at a temperature about 1000° C. or lower.

Comparative Example 4

An exhaust pipe paint, a painted pipe sample, and an exhaust pipe sample were manufactured in the same manner as in Example 1, except that inorganic glass particles were not added and the mixed powder only containing inorganic particles were manufactured in the process (1-1) of Example 1.

The surface coat layer was 5 μm in thickness in the manufactured exhaust pipe sample.

Comparative Example 5

An exhaust pipe sample was manufactured in the same manner as in Example 1, except that in the process (2-2) of Example 1, a painted pipe sample and an exhaust pipe sample were manufactured without applying an exhaust pipe paint to an exhaust pipe base.

That is, the exhaust pipe sample was obtained by performing a sandblast treatment, in the same manner as in Example 1, on the peripheral surface of the exhaust pipe base having a plate shape (100 mm in width, 100 mm in length, and 2 mm in thickness) and made of stainless steel (SUS430).

Table 1 shows the composition of the exhaust pipe paint manufactured in Examples 1 to 8, Reference examples 1 and 2, and Comparative Examples 1 to 4.

Table 1 also shows Comparative Example 5 for reference.

TABLE 1

| | Composition of exhaust pipe paint | | | | | | | |
|---|---|---|---|---|---|---|---|---|
| | Inorganic glass particles | | Inorganic particles | | Binder (binder precursor) | | Blending ratio (weight ratio) of inorganic glass particles:inorganic particles:binder | Heating temperature (° C.) |
| | Type | Softening temperature | Type | Blending ratio (weight ratio) | Use | Type | | |
| Example 1 | $Bi_2O_3$—$B_2O_3$ type | 400° C. | $MnO_2$—CuO—FeO | 6:1:1 | used | silicon tetraethoxide (Note 1) | 6:4:7 | 400 |
| Example 2 | $Bi_2O_3$—$B_2O_3$ type | 400° C. | $MnO_2$—CuO—FeO | 6:1:1 | used | silicon tetraethoxide | 6:4:7 | 500 |
| Example 3 | $Bi_2O_3$—$B_2O_3$ type | 400° C. | $MnO_2$—CuO—FeO | 6:1:1 | used | silicon tetraethoxide | 6:4:7 | 600 |
| Example 4 | BaO—$SiO_2$ type | 720° C. | $MnO_2$—CuO—FeO | 6:1:1 | used | silicon tetraethoxide | 6:4:7 | 700 |
| Example 5 | BaO—$SiO_2$ type | 720° C. | $MnO_2$—CuO—FeO | 6:1:1 | used | silicon tetraethoxide | 6:4:7 | 800 |
| Example 6 | BaO—$SiO_2$ type | 720° C. | $MnO_2$—CuO—FeO | 6:1:1 | used | silicon tetraethoxide | 6:4:7 | 900 |
| Example 7 | $Bi_2O_3$—$B_2O_3$ type | 400° C. | $MnO_2$—CuO—FeO | 6:1:1 | used | silicon tetraethoxide | 6:4:3 | 600 |
| Example 8 | $Bi_2O_3$—$B_2O_3$ type | 400° C. | $MnO_2$—CuO—FeO | 6:1:1 | used | silicon tetraethoxide | 6:4:10 | 600 |
| Reference Example 1 | $Bi_2O_3$—$B_2O_3$ type | 400° C. | $MnO_2$—CuO—FeO | 6:1:1 | used | silicon tetraethoxide | 6:4:2 | 600 |
| Reference Example 2 | $Bi_2O_3$—$B_2O_3$ type | 400° C. | $MnO_2$—CuO—FeO | 6:1:1 | used | silicon tetraethoxide | 6:4:15 | 600 |
| Comparative Example 1 | $Bi_2O_3$—$B_2O_3$ type | 400° C. | $MnO_2$—CuO—FeO | 6:1:1 | not used | — | 6:4:0 | 400 |
| Comparative Example 2 | $Bi_2O_3$—$B_2O_3$ type | 400° C. | $MnO_2$—CuO—FeO | 6:1:1 | used | methyl cellulose solution | 6:4:7 | 400 |
| Comparative Example 3 | $Bi_2O_3$—$B_2O_3$ type | 400° C. | $MnO_2$—CuO—FeO | 6:1:1 | used | lithium alkoxide (Note 2) | 6:4:7 | 400 |
| Comparative Example 4 | — | — | $MnO_2$—CuO—FeO | 6:1:1 | used | silicon tetraethoxide | 0:4:7 | 600 |
| Comparative Example 5 | — | — | — | — | — | — | — | 400 |

(Note 1) Hydrolyzed silicon tetraethoxide was used.
(Note 2) Hydrolyzed lithium alkoxide was used Painted pipe samples manufactured in Examples 2 to 8, Reference Examples 1 and 2, and Comparative Examples 1 to 4 were evaluated for emissivity and peeling of dispersoid layers in the same manner as in Example 1.

Exhaust pipe samples manufactured in Examples 2 to 8, Reference Examples 1 and 2, and Comparative Examples 1 to 4 were evaluated for emissivity, dropping of surface coat layers and thermal shock resistance in the same manner as in Example 1.

An exhaust pipe sample manufactured in Comparative Examples 5 was evaluated for emissivity in the same manner as in Example 1.

Table 2 shows the results of each Examples, each Reference Example and each Comparative Example in addition to the results of Example 1.

Also in the painted pipe sample manufactured in Reference Example 1, peeling of the dispersoid layer was prevented. However, application of mechanical shock produced a small amount of powder in the dispersoid layer.

The result indicates that, in order to more surely prevent peeling of the dispersoid layer, inorganic glass particles, inorganic particles, and an inorganic binder (precursor of an inorganic binder) are preferably blended in a weight ratio of 6:4:3. Further, the higher ratio of the inorganic binder (precursor of an inorganic binder) in the above ratio is also preferable.

On the other hand, the exhaust pipe paint manufactured in Comparative Example 1 did not include an inorganic binder, and the inorganic glass particles and the like that were powdered by performing a drying treatment at a temperature of 150° C. were not bound. Presumably because of the reasons,

TABLE 2

|  | Painted pipe sample | | Exhaust pipe sample | | |
| --- | --- | --- | --- | --- | --- |
|  | Emissivity | Dispersoid layer | Emissivity | Surface coat layer | Crack |
| Example 1 | 0.80 | not peeled | 0.81 | not dropped | not present |
| Example 2 | 0.80 | not peeled | 0.83 | not dropped | not present |
| Example 3 | 0.80 | not peeled | 0.84 | not dropped | not present |
| Example 4 | 0.81 | not peeled | 0.82 | not dropped | not present |
| Example 5 | 0.81 | not peeled | 0.82 | not dropped | not present |
| Example 6 | 0.81 | not peeled | 0.83 | not dropped | not present |
| Example 7 | 0.80 | not peeled | 0.84 | not dropped | not present |
| Example 8 | 0.80 | not peeled | 0.82 | not dropped | not present |
| Reference Example 1 | 0.80 | not peeled (Note 1) | 0.85 | not dropped | not present |
| Reference Example 2 | 0.79 | not peeled | 0.79 | not dropped | not present (Note 2) |
| Comparative Example 1 | 0.70 | peeled | 0.84 | dropped | not present |
| Comparative Example 2 | 0.70 | peeled | 0.84 | dropped | not present |
| Comparative Example 3 | 0.80 | not peeled | 0.82 | dropped | not present |
| Comparative Example 4 | 0.79 | not peeled | 0.80 | not dropped | present |
| Comparative Example 5 | — | — | 0.21 (Note 3) | — | — |

(Note 1) A small amount of powder was generated in the dispersoid layer and fell.
(Note 2) A part of the surface coat layer was deformed.
(Note 3) Since the surface coat layer was not formed, the emissivity of the exhaust pipe base was measured.

The results shown in Table 2 clearly indicate that in the exhaust pipe sample manufactured in Comparative Example 5, a surface coat layer was not formed and the emissivity was as low as 0.21.

On the other hand, the emissivities of the painted pipe samples manufactured in Examples 1 to 8, Reference Examples 1 and 2 and Comparative Examples 1 to 4 were 0.7 or more probably because the exhaust pipe paint included inorganic particles of manganese dioxide, copper oxide, and iron oxide. The emissivities of the exhaust pipe samples manufactured by using these exhaust pipe paints were 0.7 or more, and were higher than that of the exhaust pipe sample manufactured in Comparative Example 5.

The exhaust pipe paints manufactured in Examples 1 to 8, Reference Examples 1 and 2 included an inorganic binder (precursor of an inorganic binder) partially softening at the softening temperature of the inorganic glass particles (400° C. or 720° C.). Therefore, the inorganic binder did not soften even after a drying treatment at a temperature of 150° C., and the inorganic glass particles and the inorganic particle continued to be bound by the inorganic binder. Probably because of these reasons, the dispersoid layer did not peel even upon application of mechanical shock to the manufactured painted pipe sample.

the dispersoid layer peeled upon application of mechanical shock to the manufactured painted pipe sample.

In the painted pipe sample manufactured in Comparative Example 2, the exhaust pipe paint did not include an inorganic binder but instead included a methylcellulose solution as an organic binder. Probably because water (a solvent) volatilized and the binding ability of the organic binder decreased upon performing a drying treatment at a temperature of 150° C., the dispersoid layer peeled upon application of mechanical shock to the manufactured painted pipe sample.

The exhaust pipe paints manufactured in Examples 1 to 8 and Reference Examples 1 and 2 contained inorganic glass particles having a softening temperature of 400° C. or 720° C. Presumably because of this, the surface coat layers could be formed in the manufactured painted pipe samples by the heating treatment at a temperature of about or higher than the softening temperature of the inorganic glass particles.

In each of the exhaust pipe samples manufactured in Examples 1 to 8, and Reference Examples 1 and 2, the surface coat layer did not drop upon being heated at a temperature of 1100° C. and a crack did not occur in the surface coat layer.

The reason for this is presumably that the surface coat layer had a high viscosity and a high softening temperature. A part of the inorganic binder diffused in the glass substrate (inorganic glass) and the unsoftened inorganic binder in particulate form dispersed inside the glass substrate raised the viscosity and the softening temperature.

Here, the exhaust pipe sample manufactured in Reference Example 2 prevented an occurrence of a crack in the surface coat layer. However, a deformation which may result in an occurrence of a crack was found in a part of the surface coat layer. The deformation was presumably caused by the low thermal expansion coefficient of the entire surface coat layer. A large amount of the inorganic binder having a thermal expansion coefficient lower than that of the glass substrate reduced the thermal expansion coefficient of the entire surface coat layer.

The result indicates that, in order to more surely prevent an occurrence of a crack, inorganic glass particles, inorganic particles, and an inorganic binder (precursor of an inorganic binder) are preferably blended in a weight ratio of 6:4:10. Further, the lower ratio of the inorganic binder (precursor of an inorganic binder) in the above ratio is also preferable.

On the other hand, in the exhaust pipe samples manufactured in Comparative Examples 1 and 2, the surface coat layer dropped probably because the surface coat layer did not include the inorganic binder. That is, the inorganic glass and the inorganic particles contained in the surface coat layer were not bound, and when the samples were heated to a temperature of 1100° C., the viscosity of the surface coat layer fell.

The surface coat layer dropped also in the exhaust pipe sample manufactured in Comparative Example 3. The reason for this is presumably the softening temperature of the glass substrate did not rise. The exhaust pipe paint contained the inorganic binder that is considered not to soften at a temperature of about 1000° C. or lower (a temperature not exceeding the softening temperature of the inorganic glass particles). In the surface coat layer formed by a heat treatment, a part of the inorganic binder was not diffused in the glass substrate (inorganic glass). As a result, the softening temperature of the glass substrate did not rise.

A crack occurred in the exhaust pipe sample manufactured in Comparative Example 4. The reason for this is presumably that the inorganic particles and the unsoftened inorganic binder were not fixed to the surface of the exhaust pipe base with no glass substrate formed therein. Since the exhaust pipe paint did not contain the inorganic glass particles, a glass substrate was not formed even after the heat treatment.

Other Embodiments

In the exhaust pipe paint according to the embodiment of the present invention, the material of the inorganic glass particles is not particularly limited as long as they are softened by the heat of engine exhaust gas. Examples thereof include conventionally known inorganic glasses, such as soda-lime glass, alkali-free glass, borosilicate glass, potash glass, lead crystal glass, titanium crystal glass, barium glass, boron glass, strontium glass, alumina silica glass, soda zinc glass, and soda barium glass.

Of these glasses, low-melting glasses having a softening temperature of about 1000° C. or lower are preferable, and particularly those having a softening temperature of from about 300° C. to about 1000° C. are more preferable. The reason for this has been already stated and therefore is omitted here.

When the diesel engine is used as the above-mentioned engine, the inorganic glass particles preferably have a softening temperature of from about 200° C. to about 800° C. When the softening temperature of the inorganic glass particles is within the range, the surface coat layer is more easily formed by using the heat of diesel engine exhaust gas.

Examples of the low-melting glass include $SiO_2$—$B_2O_3$—ZnO type glass, $SiO_2$—$B_2O_3$—$Bi_2O_3$ type glass, $SiO_2$—PbO type glass, $SiO_2$—PbO—$B_2O_3$ type glass, $SiO_2$—$B_2O_3$—PbO type glass, $B_2O_3$—ZnO—PbO type glass, $B_2O_3$—ZnO—$Bi_2O_3$ type glass, $B_2O_3$—$Bi_2O_3$ type glass, $B_2O_3$—ZnO type glass, BaO—$SiO_2$ type glass, and the like.

The inorganic glass particles may be made of one kind of the low-melting glass or a plurality of kinds of the low-melting glasses out of the above-mentioned low-melting glasses.

The softening temperature used herein refers to a temperature at which the viscosity of the inorganic glass reaches about $4.5 \times 10^6$ Pa·s.

In the exhaust pipe paint according to the embodiment of the present invention, the desirable lower limit of the blending amount of the inorganic glass particles is about 10% by weight and the desirable upper limit thereof is about 62% by weight, with respect to the total amount of the inorganic glass particles, the inorganic particles, and the inorganic binder (precursor of the inorganic binder).

Since the amount of the inorganic glass particles is too small when the blending amount of the inorganic glass particles is less than about 10% by weight, a surface coat layer tends to drop from the manufactured exhaust pipe. On the other hand, when the blending amount of the inorganic glass particles exceeds about 62% by weight, the amount of the inorganic particles tends to decrease and heat dissipation of the exhaust pipe may fall. Further, when it exceeds about 62% by weight, the amount of the inorganic binder may decrease, and the inorganic glass particles and the inorganic particles is less likely to be sufficiently bound.

A more desirable lower limit of the inorganic glass particles is about 12% by weight, and a more desirable upper limit thereof is about 47% by weight.

In the exhaust pipe paint according to the embodiment of the present invention, the inorganic particles are not limited to inorganic particles which include at least one oxide of manganese, iron, copper, cobalt, and chromium, and may be inorganic particles which include an oxide of nickel and the like.

Moreover, the inorganic particles may be inorganic particles (metal particles) which include aluminum or the like. Since the emissivity is comparatively low when the inorganic particles which include aluminum or the like are used, heat is less likely to be radiated from the inorganic particles. Therefore, when the exhaust pipe paint with such metal particles may be suitably used for an exhaust pipe of a diesel engine that emits exhaust gas having a comparatively low exhaust gas temperature, it is easier to prevent the temperature of exhaust gas from being less than the lower limit of a catalyst activation temperature.

In the exhaust pipe paint according to the embodiment of the present invention, the desirable lower limit of the blending amount of the inorganic particles is about 10% by weight and the desirable upper limit thereof is about 62% by weight, with respect to the total amount of the inorganic glass particles, the inorganic particles, and the inorganic binder (precursor of the inorganic binder).

Since the amount of the inorganic particles having heat dissipation is too small when the amount of the inorganic particles is less than about 10% by weight, heat dissipation of the exhaust pipe tends to fall. On the other hand, since the amount of the inorganic binder decreases when the blending amount of the inorganic particles exceeds about 62% by weight, the inorganic glass particles and inorganic particles are less likely to be sufficiently bound. Further, the amount of the inorganic glass particles may decrease, and the surface coat layer tends to drop from the manufactured exhaust pipe.

A more desirable lower limit of the blending amount of the inorganic particles is about 12% by weight, and a more desirable upper limit thereof is about 47% by weight.

In the exhaust pipe paint according to the embodiment of the present invention, the desirable lower limit of the blending amount of the inorganic binder (precursor of the inorganic binder or the total of inorganic binder and precursor of the inorganic binder) is about 23% by weight and the desirable upper limit thereof is about 50% by weight, with respect to the total amount of the inorganic glass particles, the inorganic particles, and the inorganic binder (precursor of the inorganic binder).

Since the amount of the inorganic binder is too small when the blending amount of the inorganic binder is less than about 23% by weight, the inorganic glass particles and the inorganic particles are less likely to be sufficiently bound. On the other hand, since the amount of the inorganic glass particles decreases when the blending amount of the inorganic binder exceeds about 50% by weight, a surface coat layer tends to drop from the manufactured exhaust pipe. Moreover, the amount of the inorganic particles may decrease, and heat dissipation of the exhaust pipe easily falls.

A more desirable lower limit of the inorganic glass particles is about 30% by weight, and a more desirable upper limit thereof is about 45% by weight.

The viscosity of the exhaust pipe paint according to the embodiment of the present invention is not particularly limited as long as the exhaust pipe paint is easily applied to the exhaust pipe base. The viscosity may be suitably adjusted based on the method for applying the exhaust pipe paint to be mentioned later.

In order to adjust viscosity, a dispersing solvent and an organic binder may be added to the exhaust pipe paint according to the embodiment of the present invention. Examples of the dispersing solvent include water and organic solvents, such as methanol, ethanol, and acetone. The blending ratio of the mixed powder to the dispersing solvent is not particularly limited, and desirably, for example, about 50 to 150 parts by weight of the dispersing solvent with respect to 100 parts by weight of the mixed powder. It is because the desirable amount gives a viscosity suitable for applying the exhaust pipe paint to the exhaust pipe base.

Examples of the organic binder include polyvinyl alcohol, methylcellulose, ethylcellulose, carboxymethylcellulose, and the like. These may be used independently or two or more kinds thereof may be used in combination.

The dispersing solvent and the organic binder may be used in combination. In this case, the exhaust pipe paint is more likely to be surely applied to the exhaust pipe base, and it is therefore easier to surely prevent the exhaust pipe paint from dropping even with engine vibration.

In the exhaust pipe according to the embodiment of the present invention, the emissivity of the surface coat layer may be high or low.

When the emissivity of the surface coat layer is comparatively as high as about 0.5 or more, since the heat of exhaust gas is more likely to be radiated efficiently to the outside through the surface coat layer (inorganic particles), the temperature of the exhaust gas discharged from the exhaust pipe falls and is more easily controlled within the range of a catalyst activation temperature. In this case, the emissivity of the surface coat layer is more preferably about 0.7 or more, and further preferably about 0.8 or more.

In this case, in the method for producing an exhaust pipe according to the embodiment of the present invention, the emissivity of the exhaust pipe paint (dispersoid layer) after application of the paint to the exhaust pipe base and a drying treatment is preferably about 0.5 or more.

It is because the surface coat layer having an emissivity of about 0.5 or more is formed more easily by using the exhaust pipe paint. The emissivity of the exhaust pipe paint is more desirably about 0.7 or more, and more preferably about 0.8 or more.

On the other hand, when the emissivity of the surface coat layer is comparatively low, less than about 0.5, the heat of exhaust gas is less likely to be radiated to the outside through the surface coat layer (inorganic particles), and the temperature of the exhaust gas to be discharged from the exhaust pipe is more likely to increase. By using the paint for the exhaust pipe of an engine such as a diesel engine that emits exhaust gas having a comparatively low temperature, it is easier to prevent the temperature of exhaust gas from being less than the lower limit of a catalyst activation temperature. In this case, the emissivity of the surface coat layer is more preferably about 0.4 or less, and further preferably about 0.3 or less.

In this case, in the method for producing an exhaust pipe according to the embodiment of the present invention, the emissivity of the exhaust pipe paint (dispersoid layer) after application of the paint to the exhaust pipe base and a drying treatment is preferably less than about 0.5.

It is because the surface coat layer having an emissivity of less than about 0.5 is formed more easily by using the exhaust pipe paint. The emissivity of the exhaust pipe paint is more preferably about 0.4 or less, and further preferably about 0.3 or less.

The drying treatment used herein means that a dispersing solvent, a solvent, and the like, which are contained in an exhaust pipe paint, volatilize, the exhaust pipe paint is dried and solidified, and a dispersoid layer is formed on the surface of an exhaust pipe base.

Examples of a drying apparatus used for a drying treatment include a microwave drying apparatus, a hot-air drying apparatus, a dielectric drying apparatus, a reduced pressure drying apparatus, a vacuum drying apparatus, and the like.

The shape of the painted pipe (exhaust pipe) according to the embodiment of the present invention is not limited to the above-mentioned cylindrical shape, and is not particularly limited as long as it is tubular. The cross-sectional shape may be any shape, such as an elliptical shape and a polygonal shape.

When the cross-sectional shape of the exhaust pipe base has a shape other than a perfect circle, a contact area of the exhaust pipe having the cross section with exhaust gas is more likely to be large, and the heat of exhaust gas is more likely to be transmitted efficiently to the exhaust pipe base and the surface coat layer. Therefore, the heat radiation makes it easier to efficiently reduce the temperature of the exhaust gas to a catalyst activation temperature.

In the exhaust pipe according to the embodiment of the present invention, the surface coat layer desirably has a thickness of from about 1 μm to about 100 μm.

When the surface coat layer has a thickness of from about 1 μm to about 100 μm, it is more likely to excel in the above-mentioned heat dissipation.

When the surface coat layer has a very small thickness of less than about 1 μm, the region of the exhaust pipe base on which the surface coat layer is formed tends to be oxidized because of the thinness of the surface coat layer. When the exhaust pipe base is oxidized, the surface coat layer tends to drop. On the other hand, when the surface coat layer has a very large thickness exceeding about 100 μm, a big thermal shock tends to occur because of the temperature difference generated in the surface coat layer, and cracks tends to occur in the surface coat layer.

When the surface coat layer is too thin, the heat insulation property in a low-temperature region tends to be low. When the heat insulation property in the low-temperature region is low, it tends to take time to increase the temperature of exhaust gas that flows into a catalytic converter or the like to a catalyst activation temperature immediately after starting the engine.

In the painted pipe according to the embodiment of the present invention, the exhaust pipe paint desirably has a thickness of from about 1.1 μm to about 300 μm. This is because, by heating an exhaust pipe paint having a thickness within the above-mentioned range, it is easier to suitably manufacture an exhaust pipe in which the surface coat layer has a thickness of from about 1 μm to about 100 μm.

In the exhaust pipe according to the embodiment of the present invention, the thermal conductivity of the surface coat layer is desirably lower than the thermal conductivity of the exhaust pipe base. The reason for this is presumably as follows.

When the thermal conductivity of the surface coat layer is lower than the thermal conductivity of the exhaust pipe base, in the case where exhaust gas passes through the exhaust pipe and the exhaust pipe base is heated, the heat conduction rate of the exhaust pipe base is more likely to be high; whereas the heat conduction rate from the exhaust pipe base to the outside through the surface coat layer is more likely to be low. Therefore, in a low-temperature region (lower than around 500° C. in the present description) in which thermal conduction contributes to a heat transfer very much, the surface coat layer is more likely to have excellent heat insulating property. When the surface coat layer has excellent heat insulating property as described above, the temperature of exhaust gases is more likely to be increased to a catalyst activation temperature in a short period of time after starting a vehicle engine and the like.

Since the emissivity of the surface coat layer is higher than the emissivity of the exhaust pipe base in the exhaust pipe according to the embodiment of the present invention as above described, the exhaust pipe is more likely to have excellent heat dissipation in a high-temperature region in which heat radiation better contributes to heat transfer than heat conduction, even when the thermal conductivity of the surface coat layer is lower than the thermal conductivity of the exhaust pipe base.

A value of the thermal conductivity of the surface coat layer at room temperature is desirably from about 0.1 W/mK to about 4 W/mK. The thermal conductivity of the surface coat layer at room temperature can be measured by using a known method such as a hot-wire method, and a laser flash method.

In the exhaust pipe (painted pipe) according to the embodiment of the present invention, the surface coat layer (exhaust pipe paint) is not necessarily formed on the entire peripheral surface of the exhaust pipe base and may be formed only on a part of the peripheral surface of the exhaust pipe base.

However, when the surface coat layer is formed only on a part of the peripheral surface of the exhaust pipe base, the area of the portion in which the surface coat layer is formed is desirably not less than about 10% of the area of the entire peripheral surface of the exhaust pipe base.

It is because when the area of the portion in which the surface coat layer is formed is less than about 10%, the heat dissipation of the exhaust pipe tends to be insufficient, and the temperature rise of the exhaust pipe is less likely to be sufficiently controlled.

The area of the portion in which the surface coat layer is formed is preferably not less than about 50% and more preferably not less than about 80% of the area of the entire peripheral surface of the exhaust pipe base.

When the surface coat layer is formed on a part of the peripheral surface of the exhaust pipe base, the formed region is not particularly limited. The surface coat layer may be formed on one region or a plurality of regions selected from the entire peripheral surface of the exhaust pipe base. Alternatively, the surface coat layer may be formed so as to draw a regular mesh pattern or an irregular pattern on the entire peripheral surface of the exhaust pipe base.

Further, through holes (pinholes) penetrating the surface coat layer at equal intervals or at random may be formed in the surface coat layer formed on the entire peripheral surface of the exhaust pipe base.

When the exhaust pipe (painted pipe) according to the embodiment of the present invention is an exhaust manifold (painted pipe for an exhaust manifold), the maximum height Rz of the inner face (inner face of the exhaust pipe base) is desirably about 0.1 μm or more.

The reason for this is that, when the maximum height Rz of the inner face is in this range, heat of exhaust gas is easily conducted to the exhaust pipe base, facilitate heat dissipation, lower the temperature of exhaust gas, and easily control the temperature within the range of a catalyst activation temperature. A preferable upper limit of the maximum height Rz of the inner face is about 15 μm.

The exhaust pipe according to the embodiment of the present invention is not limited to an exhaust manifold, and can be suitably used as a pipe for forming the catalyst converter, as a turbine housing, or the like.

In the exhaust pipe (painted pipe) according to the embodiment of the present invention, the difference between the coefficient of thermal expansion of the exhaust pipe base and the coefficient of thermal expansion of the surface coat layer is desirably about $10 \times 10^{-6}$/° C. or less.

When the difference between the coefficients of thermal expansion is in the above-mentioned range, even in the case where hot exhaust gas passes through the exhaust pipe, dropping of the surface coat layer from the exhaust pipe base, and deformation and breakage of the surface coat layer and the exhaust pipe base are less likely to occur, so that it is easier to obtain a more reliable exhaust pipe.

Upon manufacturing the painted pipe (exhaust pipe) according to the embodiment of the present invention, it is desirable to perform a cleaning treatment before the roughening treatment. It is because it is easier to remove impurities on a surface of the exhaust pipe base and improve the adhesion of the exhaust pipe paint.

The cleaning treatment is not particularly limited, and a conventionally known cleaning treatment can be used. Specific examples thereof include a method of ultrasonic cleaning in an alcohol solvent, and the like.

At least one of plating, such as nickel plating and chrome plating, and oxidation of the peripheral surface of the exhaust pipe base may be performed before the treatment of applying the exhaust pipe paint to the peripheral surface of an exhaust pipe base.

The reason for this is that the adhesion between the exhaust pipe base and the exhaust pipe paint (surface coat layer) is more likely to be improved.

Examples of a method for applying the exhaust pipe paint upon manufacturing the painted pipe (exhaust pipe) according to the embodiment of the present invention include: electrostatic coating; ink jet; transfer using a stamp, a roller or the like; brush coating; and the like, in addition to the spray coating.

In addition, the exhaust pipe base may be immersed in the exhaust pipe paint so as to be coated with the exhaust pipe paint.

Further, when preparing the exhaust pipe paint, the exhaust pipe paint may be prepared as a composition for electrodeposition. Then, the exhaust pipe base may be immersed in the composition for electrodeposition and the peripheral surface of the exhaust pipe base may be coated with the exhaust pipe paint by electrodeposition.

In this case, when the composition for electrodeposition is prepared, presumably, the exhaust pipe paint needs to be blended with an additive for zeta potential control and for adjustment of a resistance value of the solution, and a stabilizer for securing dispersibility of inorganic glass particles and inorganic particles.

More specifically, the composition for electrodeposition may be prepared, for example, by adding a mixture of acetone and iodine to an exhaust pipe paint.

In order to apply an exhaust pipe paint by electrodeposition, an exhaust pipe base, a steel wire functioning as a positive electrode, and the like are placed in a solution which is prepared by adding acetone and iodine to the exhaust pipe paint. Further, the exhaust pipe base is allowed to function as a negative electrode, and an electric voltage may be applied.

Further, a solution prepared by dispersing the exhaust pipe paint in water and adding an organic dispersant may be used as the composition for electrodeposition.

An aerosol deposition method (AD) may also be used as a method for applying the exhaust pipe paint to the peripheral surface of the exhaust pipe base.

In this case, when preparing an exhaust pipe paint, it is desirable to prepare an exhaust pipe paint in a form of particles having a particle diameter of about 1 μm or less. The reason for this is that activity of the exhaust pipe paint is more likely to be improved.

In the case of using the AD, presumably, particles of an exhaust pipe paint collide with an exhaust pipe base in vacuum, and thus the exhaust pipe paint is applied.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An exhaust pipe paint for application to an exhaust pipe base, the exhaust pipe paint comprising:
an inorganic glass particle;
an inorganic particle; and
at least one of an inorganic binder and a precursor of said inorganic binder, said inorganic binder partially softening at a softening temperature of said inorganic glass particle,
wherein said inorganic glass particle comprises at least one of $SiO_2$—$B_2O_3$—$ZnO$ glass, $SiO_2$—$B_2O_3$—$Bi_2O_3$ glass, $SiO_2$—$PbO$ glass, $SiO_2$—$PbO$—$B_2O_3$ glass, $SiO_2$—$B_2O_3$—$PbO$ glass, $B_2O_3$—$ZnO$—$PbO$ glass, $B_2O_3$—$ZnO$—$Bi_2O_3$ glass, $B_2O_3$—$Bi_2O_3$ glass, $B_2O_3$—$ZnO$ glass, and $BaO$—$SiO_2$ glass,
wherein said inorganic binder comprises at least one of silica sol, alumina sol, and silica-alumina sol, and
wherein the precursor of said inorganic binder comprises at least one of silicon alkoxide and aluminum alkoxide.

2. The exhaust pipe paint according to claim 1,
wherein the precursor of said inorganic binder is silicon tetraethoxide.

3. The exhaust pipe paint according to claim 1,
wherein said inorganic glass particle has a softening temperature of about 300° C. to about 1000° C.

4. The exhaust pipe paint according to claim 1,
wherein a weight ratio of said inorganic glass particle, said inorganic particle, and at least one of said inorganic binder and the precursor of said inorganic binder is about 6:4:3 to about 6:4:10.

5. The exhaust pipe paint according to claim 1,
wherein the exhaust pipe paint has an emissivity of about 0.7 or more after a drying treatment.

6. The exhaust pipe paint according to claim 1,
wherein said inorganic particle comprises at least one oxide of manganese, iron, copper, cobalt, and chromium.

7. The exhaust pipe paint according to claim 1,
wherein said inorganic particle comprises aluminum.

8. A method for producing an exhaust pipe, the method comprising:
applying an exhaust pipe paint to an exhaust pipe base to manufacture a painted pipe, said exhaust pipe paint comprising an inorganic glass particle, an inorganic particle, and at least one of an inorganic binder and a precursor of said inorganic binder, said inorganic binder partially softening at a softening temperature of said inorganic glass particle;
attaching said painted pipe to an exhaust port of an engine; and
discharging exhaust gas from said exhaust port of the engine and thereby passing said exhaust gas at a temperature equal to or higher than the softening temperature of said inorganic glass particle through said painted pipe to produce a surface coat layer on said exhaust pipe base.

9. An exhaust pipe comprising:
an exhaust pipe base; and
a surface coat layer formed on said exhaust pipe base and comprising an inorganic glass layer, an inorganic particle, and an inorganic binder,
wherein, in said inorganic glass layer, a part of said inorganic binder is diffused and said inorganic particle and the rest of said inorganic binder in particulate form are dispersed.

10. The exhaust pipe according to claim 9,
wherein said inorganic binder comprises at least one of silicon and aluminum.

11. The exhaust pipe according to claim 9,
wherein said inorganic glass layer has a softening temperature of higher than about 300° C.

12. The exhaust pipe according to claim 9,
wherein a weight ratio of said inorganic glass layer, said inorganic particle, and said inorganic binder is about 6:4:3 to about 6:4:10.

13. The exhaust pipe according to claim 9,
wherein said surface coat layer has an emissivity of about 0.7 or higher.

14. The exhaust pipe according to claim 9,
wherein said inorganic particle comprises an oxide of at least one of manganese, iron, copper, cobalt, and chromium.

* * * * *